United States Patent

Nakajima et al.

[11] Patent Number: 5,974,799
[45] Date of Patent: Nov. 2, 1999

[54] HYDROSTATIC CONTINUOUSLY VARIABLE TRANSMISSION

[75] Inventors: Yoshihiro Nakajima; Hiroshi Karatsu; Kazuhiro Nakamura, all of Saitama, Japan

[73] Assignee: Honda Giken Kogyo Kabushiki Kaisha, Tokyo, Japan

[21] Appl. No.: 08/856,193

[22] Filed: May 14, 1997

[30] Foreign Application Priority Data

May 14, 1996 [JP] Japan .................................. 8-118647

[51] Int. Cl.$^6$ .................................................. F16H 39/14
[52] U.S. Cl. .............................................. 60/468; 60/487
[58] Field of Search ........................... 60/487, 489, 468; 91/478, 479, 480, 482, 483; 137/504, 505.13, 509

[56] References Cited

U.S. PATENT DOCUMENTS

| | | | |
|---|---|---|---|
| 3,165,892 | 1/1965 | Roberts | 60/489 |
| 4,781,022 | 11/1988 | Hayashi et al. | 60/489 |
| 4,827,721 | 5/1989 | Hayashi et al. | |
| 4,916,901 | 4/1990 | Hayashi et al. | 60/489 |
| 4,938,024 | 7/1990 | Matsuto et al. | 60/468 |
| 5,038,634 | 8/1991 | Matsuto et al. | |

FOREIGN PATENT DOCUMENTS 63-111362  5/1988  Japan .

*Primary Examiner*—John E. Ryznic
*Attorney, Agent, or Firm*—Birch, Stewart, Kolasch & Birch, LLP.

[57] ABSTRACT

A gear ratio is controlled to infinity so as to allow a vehicle to get underway smoothly with a hydrostatic continuously variable transmission equipped with a hydraulic pump having a cam plate with a fixed angle of inclination and a hydraulic motor having a cam plate with a variable angle of inclination. First distributing valves allow the cylinder holes of a hydraulic pump to selectively communicate with a low pressure oil circuit and high pressure oil circuit are operated by a first eccentric ring located in an eccentric weight ring. The eccentric weight ring rotates along with an input cylinder shaft and moves as a result of centrifugal force in a direction tilted 45° with respect to an imaginary trunnion line $O_1$ of the hydraulic pump so that the phase in the direction of eccentricity of the first eccentric ring is automatically changed. The first eccentric ring is off center in the direction perpendicular to the imaginary trunnion line $O_1$ during low speed rotation, resulting in an infinite gear ratio, and is off center in the direction along the imaginary trunnion line $O_1$ during high speed rotation, resulting in a gear ratio with a prescribed low value.

12 Claims, 13 Drawing Sheets

High speed driving state

High speed driving state

Low speed driving state

HYDROSTATIC CONTINUOUSLY VARIABLE TRANSMISSION

BACKGROUND OF THE INVENTION

1. Field of the Invention

The present invention relates to a hydrostatic continuously variable transmission that can be used in two-wheel motor vehicles or automobiles, and which includes a hydraulic pump with a cam plate having a fixed angle of inclination and a hydraulic motor with a cam plate having a variable angle of inclination which are connected to each other via a closed hydraulic circuit consisting of a low pressure oil route and a high pressure oil route.

2. Description of Background Art

In hydrostatic continuously variable transmissions equipped with a fixed displacement cam plate type of hydraulic pump and a variable displacement cam plate type of a hydraulic motor, where the pump cylinder and motor cylinder are integrated, the gear ratio is obtained by the following formula, resulting in an actual gear ratio of about 1 to 3.

Gear ratio=1+(hydraulic motor volume/hydraulic pump volume)

In order to get the vehicle moving by slipping the clutch during the transfer of power from the input members to the output members using such a hydrostatic continuously variable transmission, the high pressure oil route connected to the hydraulic pump has conventionally been outfitted with a clutch valve (operated by means of the centrifugal governor); the clutch valve opens when the vehicle gets underway, allowing the hydraulic pressure of the high pressure oil route to be released to the discharge port, and the clutch valve gradually closes with the increase in revolutions, allowing the hydraulic pressure of the high pressure oil route to reach the hydraulic motor.

In Japanese Laid-Open Patent Application 63-111362, the phase in the direction of eccentricity of the eccentric ring that actuates the distributing valves of the hydraulic pump is varied to improve the pumping efficiency of the hydraulic pump.

However, when a hydrostatic continuously variable transmission is equipped with a clutch valve to start the vehicle moving, not only is the complex structure a problem, but the operating stability is diminished by variations in the oil temperature.

SUMMARY OF THE INVENTION

In view of the foregoing, an object of the present invention is to provide a hydrostatic continuously variable transmission with a simple structure in which the phase in the direction of eccentricity of the eccentric ring that is used to operate the distributing valves of the hydraulic pump is controlled so as to enable a vehicle to get underway smoothly using a large gear ratio when the vehicle begins to move.

To achieve the aforementioned objectives, the invention includes a hydrostatic continuously variable transmission in which a hydraulic pump with a cam plate having a fixed angle of inclination and a hydraulic motor with a cam plate having a variable angle of inclination are connected to each other via a closed hydraulic circuit consisting of a low pressure oil route and a high pressure oil route. The oil pump includes a pump cylinder rotatably supported around an axis, a plurality of cylinder holes which are arranged in a circle around the pump cylinder and into which a plurality of pump plungers are slidably positioned. A plurality of first distributing valves allow the cylinder holes to communicate selectively with the aforementioned closed hydraulic circuit. A first eccentric ring is arranged eccentrically with respect to the aforementioned axis A so as to drive the first distribution valves. The hydraulic motor includes a motor cylinder rotatably supported around the axis in an integral manner with the aforementioned pump cylinder. A plurality of cylinder holes are arranged in a circle around the motor cylinder and into which a plurality of motor plungers are slidably positioned. A plurality of second distribution valves allow the cylinder holes to selectively communicate with the aforementioned closed hydraulic circuit. A second eccentric ring is arranged eccentrically with respect to the aforementioned axis so as to drive the second distribution valves. The hydrostatic continuously variable transmission varies the phase angle in the direction of eccentricity of the aforementioned first eccentric ring around the aforementioned axis, so as to allow some of the plurality of cylinder holes to communicate with the high pressure oil route during the hydraulic pump discharge stroke and the remainder to communicate with the low pressure oil route and to allow some of the plurality of cylinder holes 7 to communicate with the low pressure oil route 50 during the suction stroke of the hydraulic pump P and the remainder to communicate with the high pressure oil route 51, thereby allowing the essential volume of the hydraulic pump to be varied so as to control the gear ratio.

The present invention includes a neutral valve that shortens the aforementioned low pressure oil route and high pressure oil route between the hydraulic pump and the hydraulic motor.

The present invention includes the phase angle in the direction of eccentricity of the aforementioned first-eccentric ring which is varied by the centrifugal force acting on the first eccentric ring.

The present invention includes the range where the gear ratio r is $1 \leq r < 3$ is under the control of the angle of inclination of the cam plate of the hydraulic motor, and the range where the gear ratio r is $r \geq 3$ is under the control of the phase angle in the direction of eccentricity of the first eccentric ring of the hydraulic pump.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Preferred embodiments of the present invention are described below with reference to practical examples of the invention depicted in the attached drawings.

Figure 1:
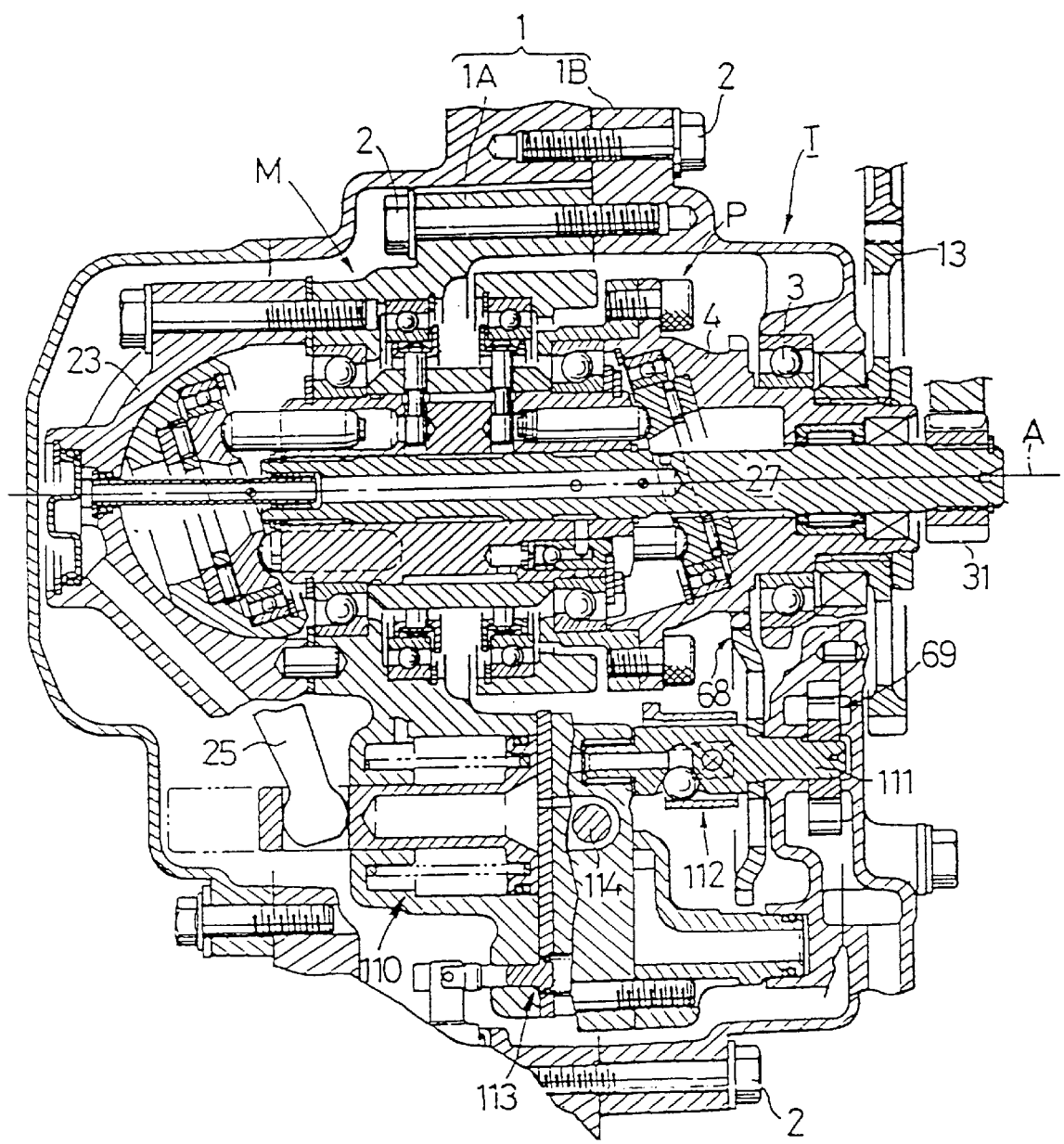
FIG. 1 is a vertical cross-sectional view of a hydrostatic continuously variable transmission for a two-wheel motor vehicle in a practical example of the present invention.
Figure 2:
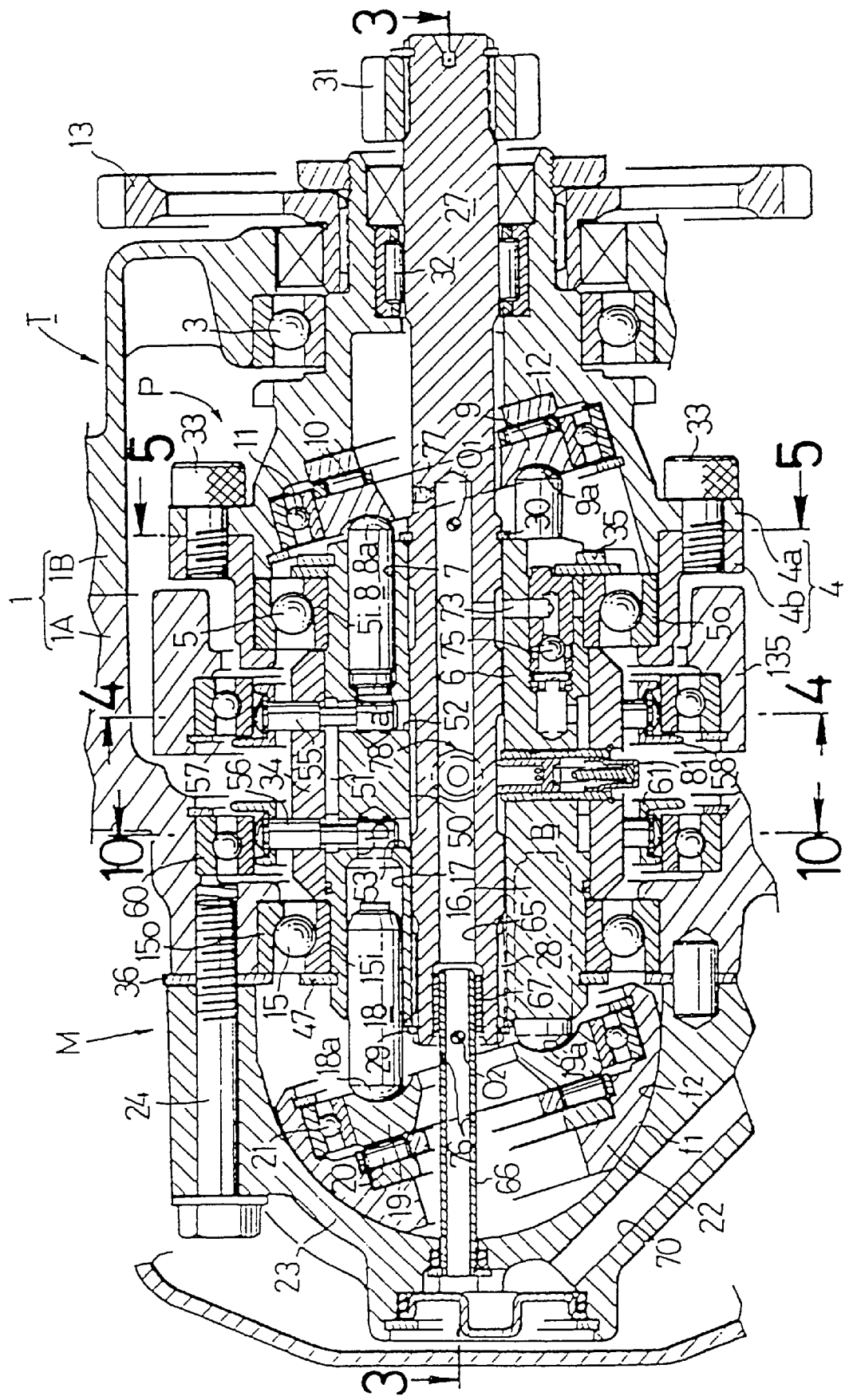
FIG. 2 is an enlarged view of the main portion in FIG. 1.
Figure 3:
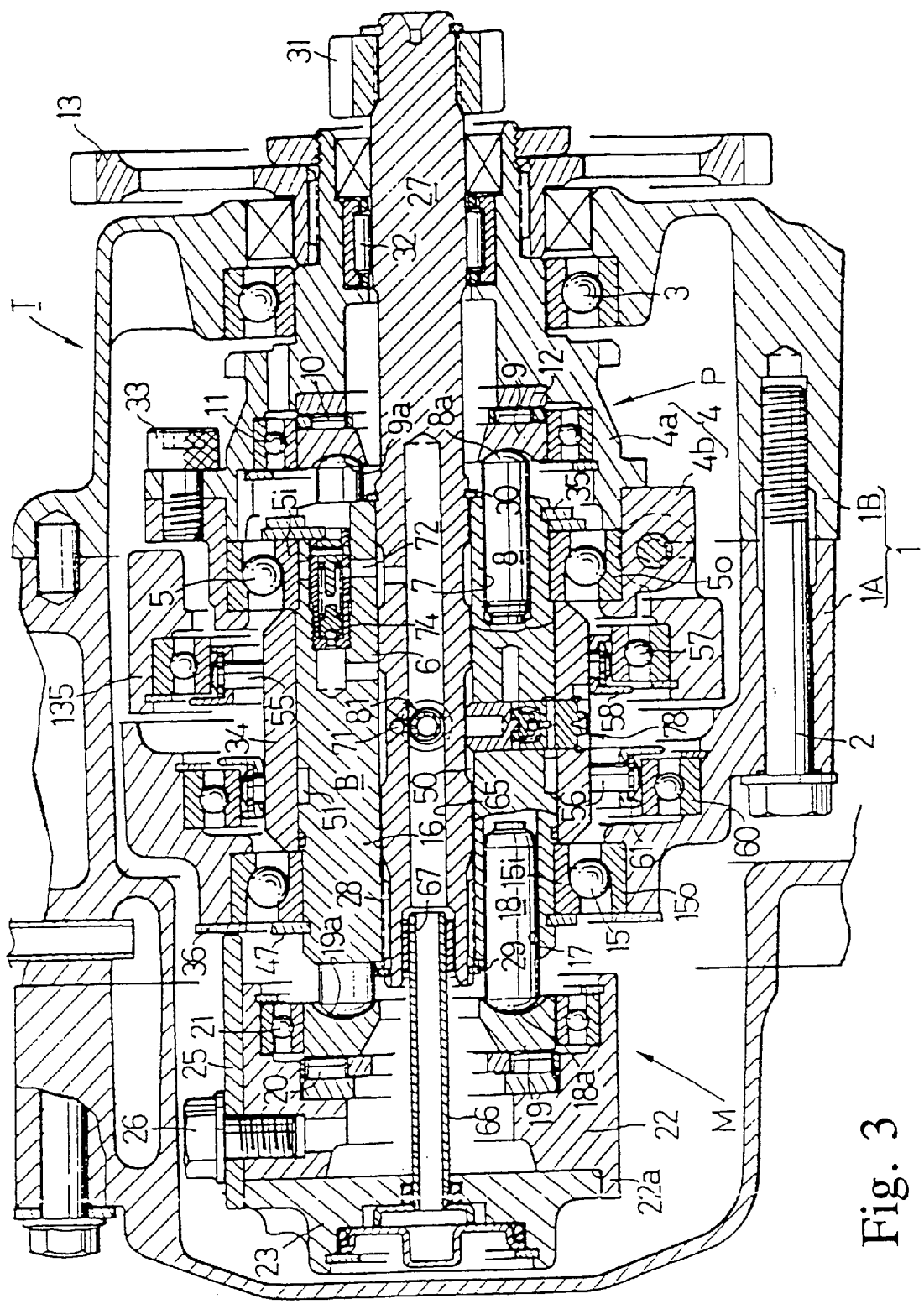
FIG. 3 is a cross-sectional view taken along line 3—3 in FIG. 2.

FIGS. 1 through 15(B) depict practical examples of the present invention. As shown in FIGS. 1 through 3, the transmission case in the power unit of a two-wheel motor vehicle is composed of left and right case halves 1A and 1B joined by means of bolts 2. The transmission case houses a continuously variable transmission T composed of a hydraulic pump P with a cam plate having a fixed angle of inclination and a hydraulic motor M with a cam plate having a variable angle of inclination, between which a closed hydraulic circuit is formed.

The hydraulic pump P includes an input cylinder shaft 4 supported (rotatably, and displaceably in the axial direction) by a radial bearing 3 on the external end of the right case half 1B. A pump cylinder is provided which is relatively rotatably supported by a first angular contact bearing 5 on the input cylinder shaft 4. A plurality of pump plungers 8 are slidably positioned into a plurality (odd numbered) of cylinder holes 7 arranged in a circle around the axis of rotation A (see FIG. 1) on the pump cylinder 6. A pump cam plate 9 includes a front surface which is in contact with the external ends of the pump plungers 8. A pump cam plate holder 12 supports the pump cam plate 9 by means of a thrust bearing 10 and a radial bearing 11 so that the cam plate 9 is held at a fixed angle of inclination with respect to the axis A of the pump cylinder 6 while being centered on an imaginary trunnion axis $O_1$ (see FIG. 2) perpendicular to the axis A of the pump cylinder 6. The pump cam plate holder 12 is integrally formed with the input cylinder shaft 4.

The right end of the input cylinder shaft 4 protrudes to the outside of the right case half 1B. An input gear 13, through which engine power is inputted (not shown in figure), is fixed to the input cylinder shaft 4.

The pump cam plate 9 allows the suction and discharge strokes to be repeated with the reciprocal motion of the pump plungers 8 during the rotation of the input cylinder shaft 4.

The hydraulic motor M, includes a motor cylinder 16 arranged on the left half coaxially with the axis A of the pump cylinder 6 which is rotatably supported by means of a second angular contact bearing 15 in the left case half 1A. A plurality of motor plungers 18 are slidably positioned into a plurality (odd numbered) of cylinder holes 17 arranged in a circle around the axis A on the motor cylinder 16. A motor cam plate 19 includes a front surface which is in contact with the external ends of the motor plungers 18. A motor cam plate holder 22 supports the motor cam plate 19 by means of a thrust bearing 20 and a radial bearing 21. A motor cam plate anchor 23 supports the back side of the motor cam plate holder 22. The motor cam plate anchor 23 is fixed by a plurality of bolts 24 to the external end of the left case 1A.

The opposing faces $f_1$ and $f_2$ of the motor cam plate holder 22 and the motor cam plate anchor 23 that are in contact with each other form a semicylindrical surface centered on a trunnion axis $O_2$ (see FIG. 2) which is perpendicular to the axis A of the motor cylinder 16, allowing the motor cam plate holder 22 to tilt around the trunnion axis $O_2$.

To arrest the relative sliding of the motor cam plate holder 22 and the motor cam plate anchor 23 in the direction of the trunnion axis $O_2$, a flange 22a, in contact with one end face of the motor cam plate anchor 23, is formed on one end of the motor cam plate holder 22. A gear lever 25, in contact with the other end face of the motor cam plate anchor 23, is fixed with a bolt 26 to the other end face of the motor cam plate holder 22, as shown in FIG. 3. The aforementioned gear lever 25 can accordingly be rotated to allow the motor cam plate holder 22 to tilt around the trunnion axis $O_2$ and adjust the motor cam plate 19 between an upright position at right angles to the axis of the motor cylinder 16 and the maximum inclined position at a given angle.

When the motor cylinder 16 is rotated with the motor cam plate 19 inclined, the motor plungers 18 are reciprocally moved by the motor cam plate 19, allowing the expansion and compression strokes to be repeated.

The aforementioned pump cylinder 6 and motor cylinder 16 are integrally formed to construct a cylinder block B. An output shaft 27 passing through the center of the cylinder block B is joined in the direction of rotation by means of a spline 28. The output shaft 27 is joined in the axial direction to the cylinder block B by means of a pair of left and right C-clips 29 and 30.

The output shaft 27 terminates in front of the motor cam plate 19, with the right end protruding through the input cylinder shaft 4 to the outside. An output gear 31, for outputting power to the rear wheel of the two-wheel motor vehicle (not shown in figure), is attached to the protruding end. At this time, the output shaft 27 is supported (rotatably, and displaceably in the axial direction) on the input cylinder shaft 4 by means of a radial bearing 32.

The aforementioned input cylinder shaft 4 is divided into a funnel-shaped component 4a that is integrated with the pump cam plate holder 12 and that is supported in the right case half 1B by means of a radial bearing 3. A cylindrical component 4b supports the pump cylinder 6 by means of a first angular contact bearing 5, where both 4a and 4b are joined by a bolt 33. At this time, the outer race 5o of the first angular contact bearing 5 is sandwiched between the two parts 4a and 4b. The inner race 5i of the same bearing 5 is fixed by means of a sleeve 34 (described below) and C-clip 35 on the outer peripheral face of the pump cylinder 6. The input cylinder shaft 4 and pump cylinder 6 are thus immovably joined axially with the first angular contact bearing 5.

The aforementioned second angular contact bearing 15 is set up near the inside (in the radial direction) of a plurality of bolts 24 joining the motor cam plate anchor 23 to the external end of the left case half 1A. The outer race 15o of said bearing 15 is fixed to the left case half 1A by a keep plate 36 stopped between the left case half 1A and motor cam plate anchor 23, and the inner race 15i is fixed by a sleeve 34 (described below) and C-clip 47 on the outer peripheral face of the motor cylinder 16. The motor cylinder 16 and motor cam plate anchor 23 are thus immovably joined axially with the second angular contact bearing 15.

To synchronize the revolution of the pump cam plate 9 with that of the pump cylinder 6, spherical concave components 9a that are engaged by spherical end components 8a of the pump plungers 8 are formed on the front face of the pump cam plate 9.

To synchronize the revolution of the motor cam plate 19 with that of the motor cylinder 16, spherical concave components 19a that are engaged by spherical end components 18a of the motor plungers 18 are formed on the front face of the motor cam plate 19.

The aforementioned spherical concave components 9a and 19a have a radius greater than that of the aforementioned spherical ends 8a and 18a, allowing them to be engaged with the spherical ends 8a and 18a at any operating position.

Figure 11:
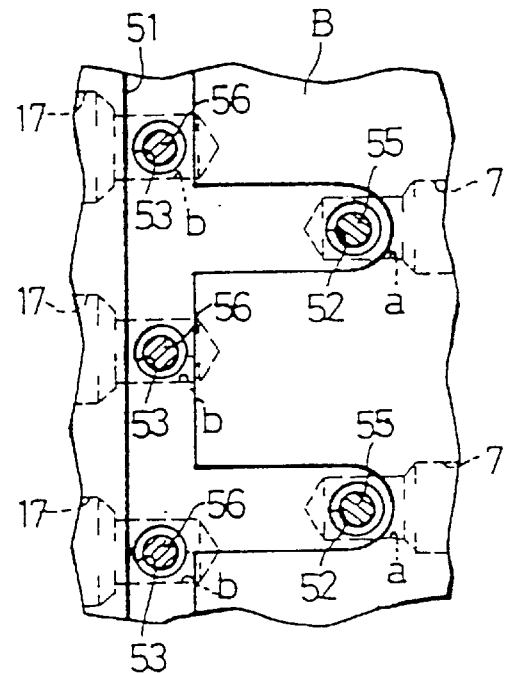
FIG. 11 is a development of FIGS. 2 and 3.

As shown in FIGS. 2, 3, and 11, between the pump cylinder 6 and the motor cylinder 16, on the inner peripheral side of the cylinder block B an annular inner oil route 50 (low pressure oil route) is formed on the outer peripheral face of the output shaft 27. On the outer peripheral side, an annular outside oil route 51 (high pressure oil route) is formed along the sleeve 34 fitted to the outer peripheral face of the block B. The annular wall and sleeve 34 between these two oil routes 50 and 51 are perforated with a group of first valve holes 52 and a group of second valve holes 53 that radially pass through so as to adjoin groups of cylinder holes 7 and 17, respectively. The adjoining first valve holes 52 and cylinder holes 7 communicate with each other through a pump port a, and the adjoining second valve holes 53 and cylinder holes 17 communicate with each other through a motor port b. Spool type first distributing valves 55 fit into the first valve holes 52, and spool type second distributing valves 56 similarly fit into the second valve holes 53.

Figure 4:
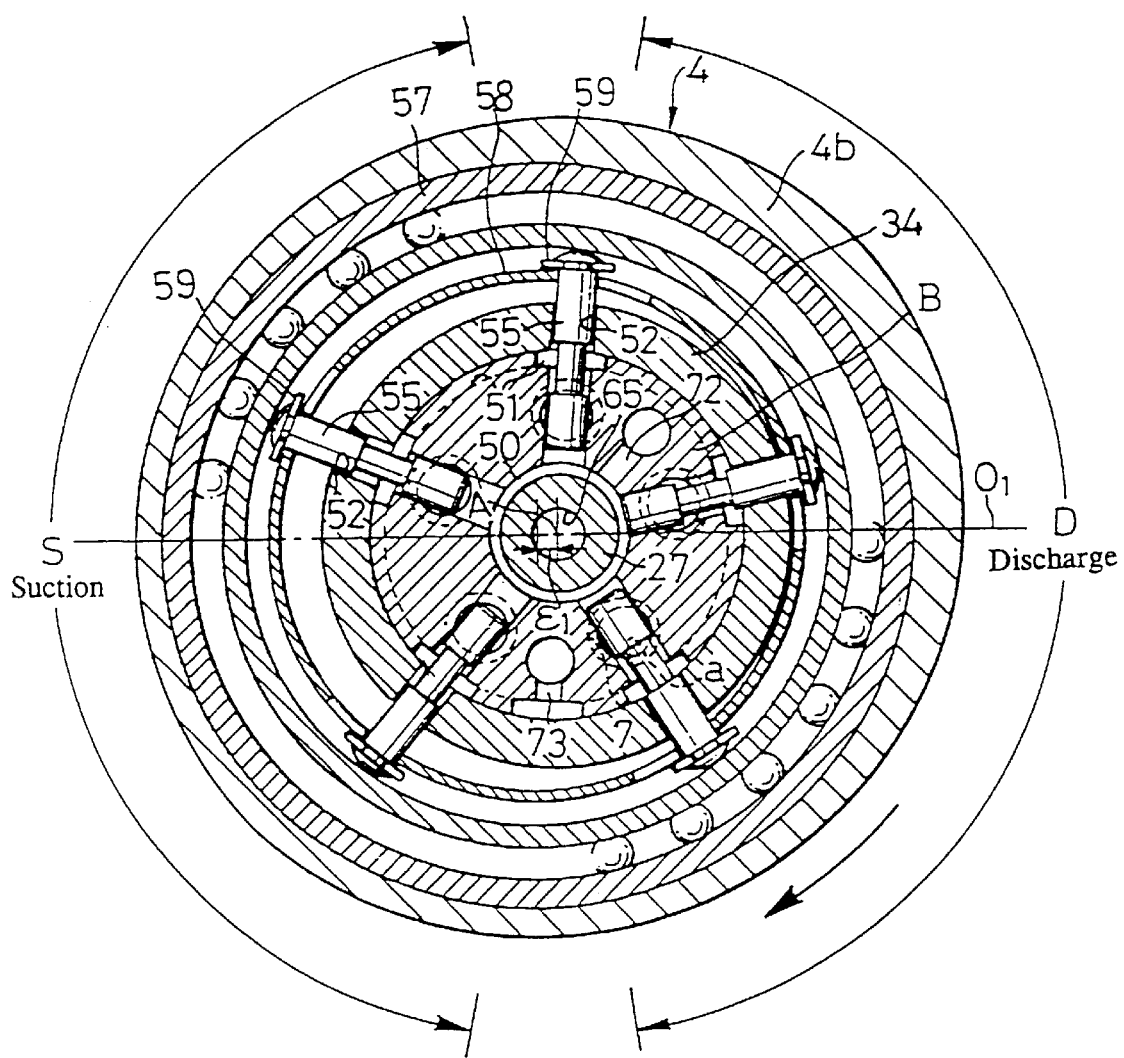
FIG. 4 is a cross-sectional view taken along line 4—4 in FIG. 2.

As shown in FIG. 4, a first eccentric ring 57 engages the outer end of the valves 55 and is arranged on the outer periphery of the group of first distributing valves 55. To ensure that the first distributing valves 55 and the first eccentric ring 57 are always engaged, the first eccentric ring 57 and a concentrically related first restraining ring 58 are joined by means of a clip 59 to the first distributing valves 55.

The first eccentric ring 57 is composed of ball bearings, and the eccentric disposition is automatically changed according to the number of revolutions of the input cylinder shaft 4, as will be described below. FIG. 4 corresponds to a high speed driving state with a high number of input cylinder shaft 4 revolutions. In this high speed driving state, the first eccentric ring 57 is held in a position that is off center by a prescribed distance $\epsilon_1$ from the center of the output shaft 27 along the aforementioned imaginary trunnion axis $O_1$, just as it is in a conventional continuously variable transmission T.

Accordingly, when the input cylinder shaft 4 and pump cylinder 6 rotate relative to each other, the first distributing valves 55 are moved reciprocally in the form of strokes two times the distance of the amount of eccentricity $\epsilon_1$ into the first valve holes 52 by the first eccentric ring 57. In the discharge zone D of the hydraulic pump P the first distributing valves 55 travel to the inner end side of the first valve holes 52 and communicate with the outside oil route 51 through the corresponding pump port a but not with the inside oil route 50 and the working oil is pumped from the cylinder holes 7 to the outside oil route 51 by the pump plungers 8 during the discharge stroke. In the suction zone S the first distributing valves 55 travel to the outer end side of the first valve holes 52 and communicate with the inside oil route 50 through the corresponding pump port a but not with the outside oil route 51 and the working oil is suctioned from the inside oil route 50 to the cylinder holes 7 by the pump plungers 8 during the suction stroke.

Figure 10:
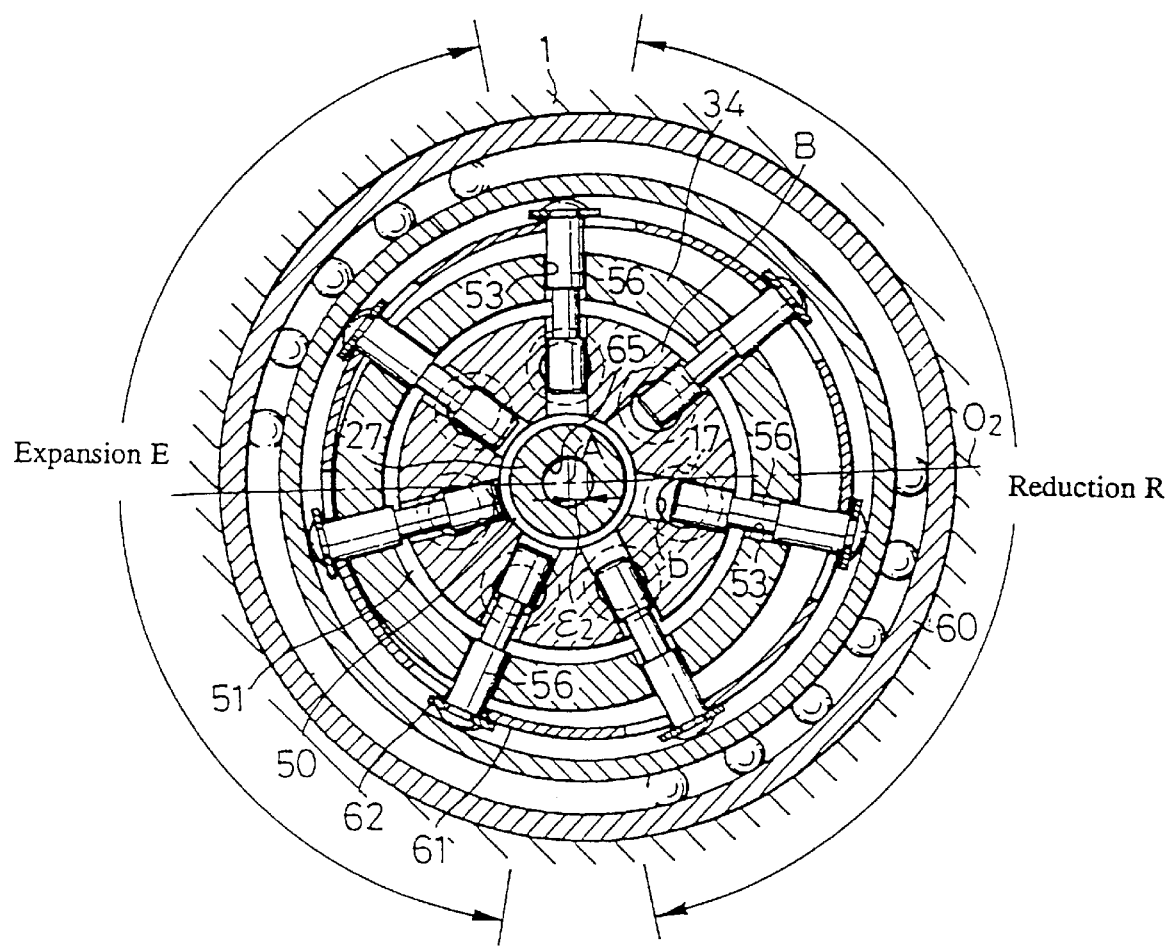
FIG. 10 is a cross-sectional view taken along line 10—10 in FIG. 2.

As shown in FIG. 10, a second eccentric ring 60 engages the outer end of the valves 56 and is arranged on the outer periphery of the group of second distributing valves 56. To ensure that the second distributing valves 56 and the second eccentric ring 60 are always engaged, the second eccentric ring 60 and a concentrically related second restraining ring 61 are joined by means of a clip 62 to the second distributing valves 56.

The second eccentric ring 60 is composed of ball bearings, and is attached to the left case half 1A so as to be held in a position that is off center by a prescribed distance $\epsilon_2$ from the center of the output shaft 27 along the aforementioned imaginary trunnion axis $O_2$.

Accordingly, when the motor cylinder 16 rotates, the second distributing valves 56 are moved reciprocally in the form of strokes two times the distance of the amount of eccentricity $\epsilon_2$ into the second valve holes 53 by the second eccentric ring 60. In the expansion zone E of the hydraulic motor M, the second distributing valves 56 travel to the inner end side of the second valve holes 53 and communicate with the outside oil route 51 through the corresponding motor port b but not with the inside oil route 50 and the high pressure working oil is fed from the outside oil route 51 to the cylinder holes 17 for the motor plungers 18 during the expansion stroke. In the reduction zone R, the second distributing valves 56 travel to the outer end side of the second valve holes 53 and communicate with the inside oil route 50 through the corresponding motor port b but not with the outside oil route 51, and the working oil is returned from the cylinder holes 17 for the motor plungers 18 to the inside oil route 50 during the reduction stroke.

The cylinder block B is thus rotated by the sum of the reaction torque received from the pump cam plate 9 by way of the pump plungers 8 during the discharge stroke and the reaction torque received from the motor cam plate 19 by way of the motor plungers 18 during the expansion stroke, and this rotation torque is transmitted to the output shaft 27.

As may be seen in FIG. 1, the front end of the gear lever 25 for changing the angle of inclination of the motor cam plate 19 is connected to a hydraulic servo motor 110. The operation of the hydraulic servo motor 110 is controlled by a control valve 114 connected to a hydraulic governor 112 located on the rotating shaft 111 of a supply pump 69 and to a throttle valve 113 that is operated according to the degree to which the throttle is opened. As the number of engine rotations (that is, the number of rotations of the rotating shaft 111 of the aforementioned supply pump 69) increases, the hydraulic servo 110 decreases the angle of inclination of the motor cam plate 19 from the low position (maximum inclination positions to the top position (upright position), and as the degree to which the throttle is open decreases, the servo decreases the angle of inclination of the motor cam plate 19 from the low position (maximum inclination position) to the top position (upright position).

In this case, the gear ratio of the output shaft 27 with respect to the input cylinder shaft 4 is obtained by the following formula.

$$\text{Gear ratio}=1+(\text{hydraulic motor M volume/hydraulic pump P volume}) \qquad (1)$$

Thus, when the volume of the hydraulic motor M changes from zero to a given value, the gear ratio can move from 1 to a given value (3, for example). Since, moreover, the volume of the hydraulic motor M is determined by the stroke of the motor plungers 18, the motor cam plate 19 can be moved from an upright position to a certain inclined position so as to continuously control, for example, the gear ratio from 1 to 3.

In FIGS. 1 through 3, the center of the output shaft 27 is perforated with supply holes 65 on the hydraulic motor M side, and an oil guiding tube 66 that extends from the motor cam plate anchor 23 to the inlet and that passes through the center of the motor cam plate 19 and motor cam plate holder 22 is relatively rotatably fitted through a bushing 67. This oil guiding tube 66 passes through an oil route 70 that is formed on the motor cam plate anchor 23 and transmission case 1 to the discharge outlet of the supply pump 69 which is driven by the input cylinder shaft 4 via a gear train 68. During the rotation of the input cylinder shaft 4, the supply pump 69 supplies working oil, which has been suctioned up from the oil route at the bottom of the transmission case 1, through the oil route 70 and oil guiding tube 66 to the supply port 65.

The supply port 65 is connected to the aforementioned inside and outside oil routes 50 and 51 through first and second branched routes 72 and 73 with which the output shaft 27 and cylinder block B have been perforated, and these first and second branched routes 72 and 73 are provided with first and second check valves 74 and 75. A third check valve 71 is provided between the supply port 65 of the output shaft 27 and the inside oil route 50. During ordinary driving, when the inside oil route 50 pressure is reduced by oil leakage from the hydraulic pump P and hydraulic motor M, the third check valve 71 opens to supply working oil from the supply port 65 to the inside oil route 50, and when the outside oil route 51 pressure decreases during engine braking, the second check valve 75 opens to allow working oil to be supplied from the supply port 65 to the outside oil route 51. When the oil pressure of the inside oil route 50 becomes excessively high during engine braking, the first check valve 74 opens to allow the oil pressure to be released from the inside oil route 50 to the supply port 65.

The peripheral wall of the aforementioned oil guiding tube 66 is provided with a plurality of nozzle holes 76 from which working oil is sprayed to provide lubrication around the motor cam plate 19. The output shaft 27 is provided with nozzle holes 77 communicating with the supply port 65, and working oil sprayed from them is used to provide lubrication around the pump cam plate 9.

Figure 12:
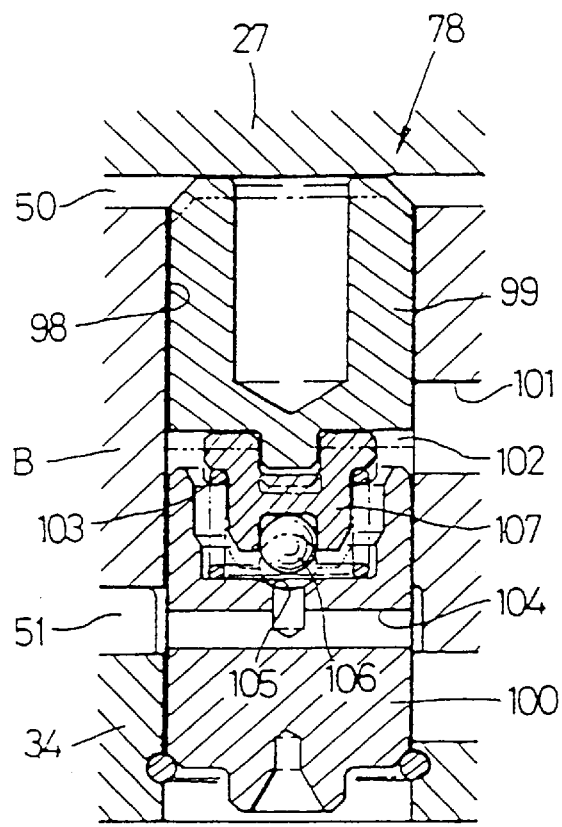
FIG. 12 is a vertical cross-sectional view of a torque limit valve.

As shown in FIGS. 3 and 12, a torque limit valve 78 has a valve piston 99 that slidably fits into a cylindrical attachment hole 98 made in the cylinder block B between the inside and outside oil routes 50 and 51, with one end of the valve piston abutting on the inside oil route 50. A plug 100 is fixed to the attachment hole 98 at the other end of the valve piston 99. An oil chamber 102 that is open to an oil reservoir through a discharge port 101 is formed between the valve piston 99 and the plug 100, and this oil chamber 102 houses a return spring 103 that energizes the valve piston 99 toward the inside oil route 50 side.

The plug 100 is provided with a through hole 104 communicating with the outside oil route 51, and a conical valve seat 105 that is open through this through hole 104 to the aforementioned oil chamber 102. A spherical valve element 106 of a slightly smaller diameter than the valve piston 99, which can be seated in the valve seat 105, is attached to the valve piston 99 by means of a retainer 107.

The high oil pressure of the outside oil route 51 always acts on part of the spherical valve element 106 of slightly smaller diameter than the valve piston 99, so if by some chance the hydraulic motor M is overloaded and produces excessive oil pressure in the outside oil route 51, the force of this excessive oil pressure against the valve element 106 increases the pressure force of the inside oil route 50 pressing against the oil pressure valve piston 99 and presses the valve element 106 open, allowing the excessive oil pressure in the outside oil route 51 to be released to the discharge port 101 and allowing the aforementioned overload to be avoided.

The structure of a means 131 for automatically changing the direction of eccentricity of the first eccentric ring 57 when the vehicle starts to move is described below with reference to FIGS. 5 through 9.

A pair of guide pin supports 132 is integrally formed with the cylindrical component 4b of the input cylinder shaft 4 that rotatably supports the pump cylinder 6 by means of the first angular contact bearing 5. Two guide pins 133 are fixed with socket screws 134 to these guide pin supports 132. The two guide pins 133 are parallel to each other, their direction being inclined 45° around the axis A with respect to the imaginary trunnion axis $O_1$ of the hydraulic pump P.

The aforementioned first eccentric ring 57 is supported on the inner periphery of an eccentric weight ring 135 formed roughly in the shape of a circle. Four guide protrusions 136, protruding in the axial A direction from one side of the eccentric weight ring 135, are slidably fit around the outside of the two aforementioned guide pins 133, so that the eccentric weight ring 135 can move in the direction of the guide pins 133 inclined 45° around the axis A with respect to the imaginary trunnion axis $O_1$ along with the first eccentric ring 57. The eccentric weight ring 135 is equipped with a weight component 135a that juts out at one end in the axial A direction on the diametric line parallel to the guide pins 133, and is also equipped with a spring bracket 135b that juts out at the other end in the axial A direction. Two coil springs 138 and 139 are loaded between a spring seat 141 (engaged by a clip 140 to the spring bracket 135b) and a spring seat 137 (formed on the cylindrical component 4b of the input cylinder shaft 4).

Figure 6:
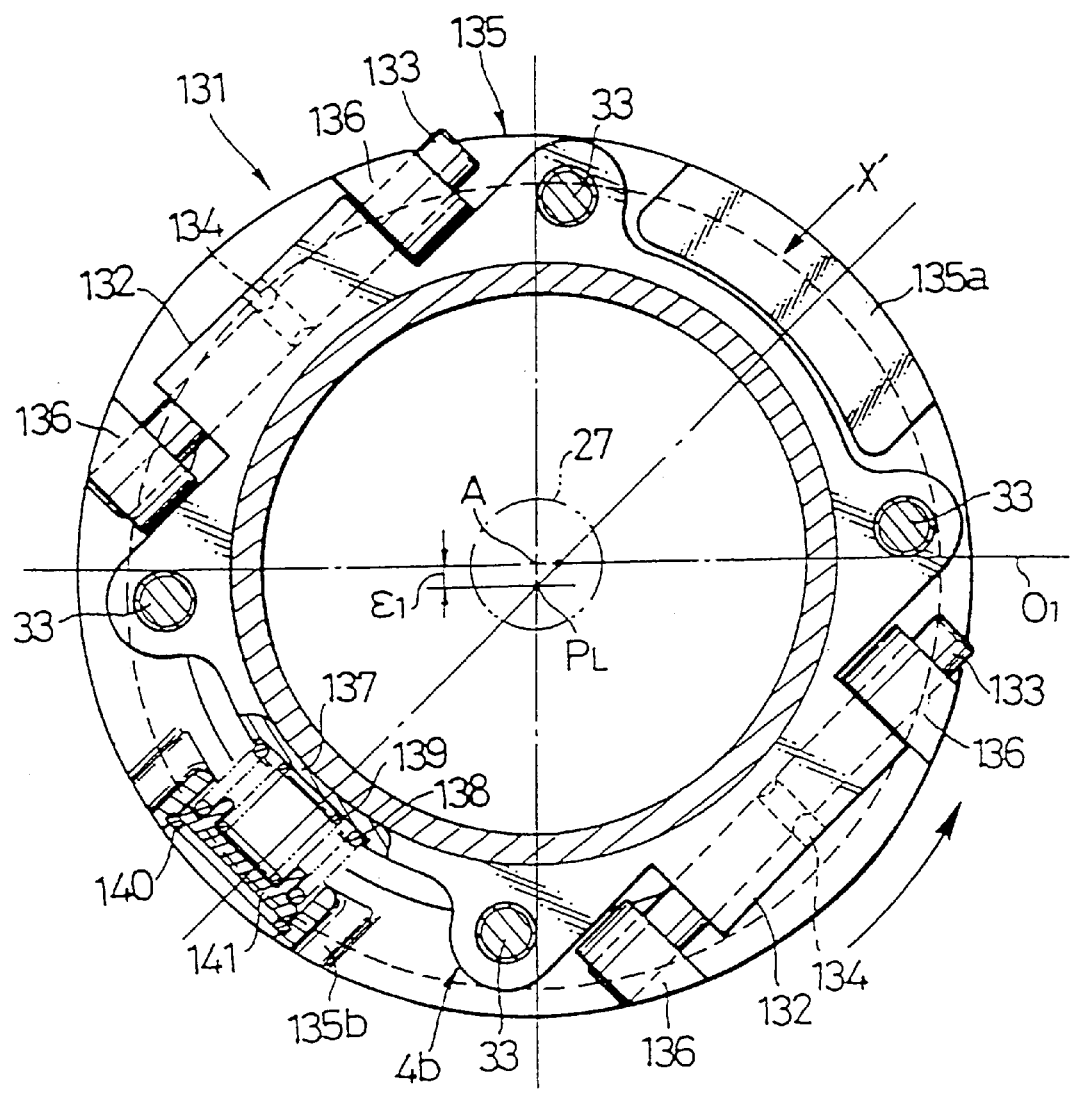
FIG. 6 is an illustration of the operations corresponding to FIG. 5.
Figure 7:
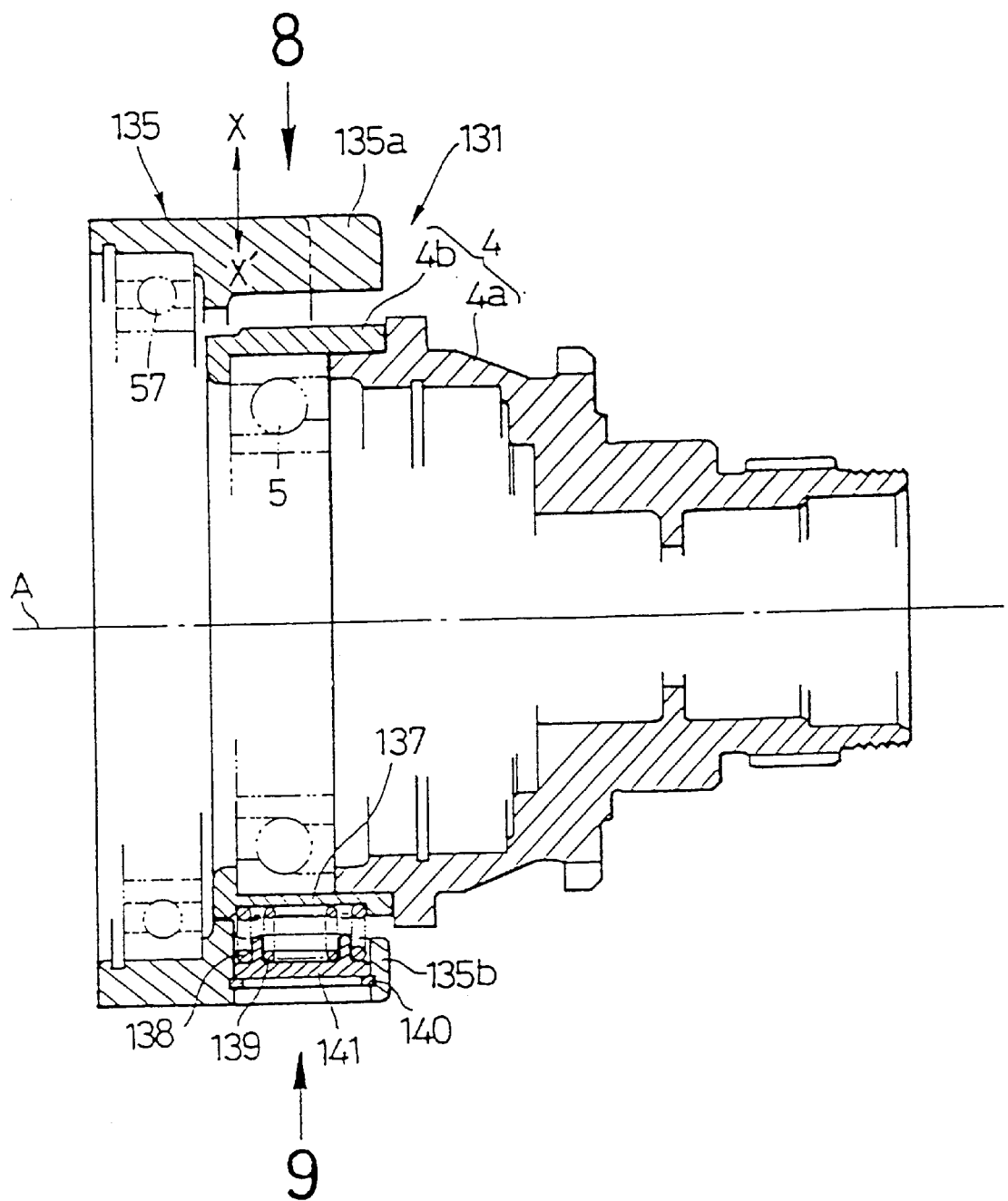
FIG. 7 is a cross-sectional view taken along line 7—7 in FIG. 5.
Figure 8:
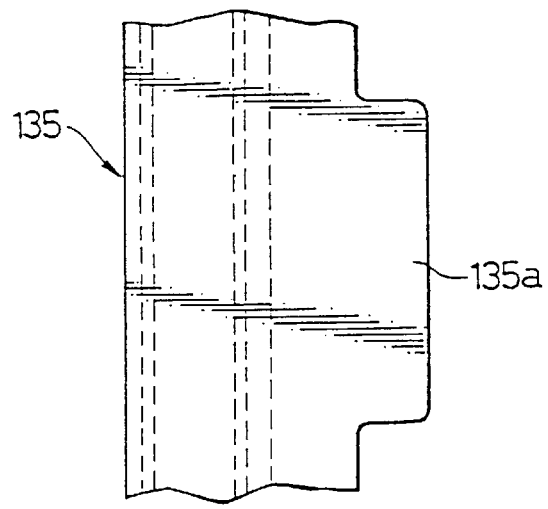
FIG. 8 is a view in the direction of arrow 8 in FIG. 7.
Figure 9:
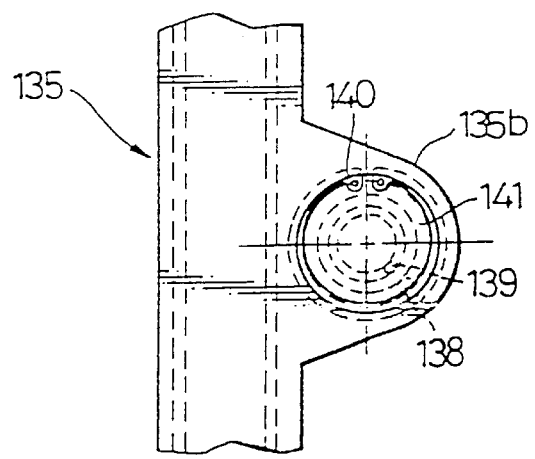
FIG. 9 is a view in the direction of arrow 9 in FIG. 7.

In the low speed driving state, where low centrifugal force is acting on the aforementioned weight component 135a, the eccentric weight ring 135 moves in the direction of the arrow X' in FIGS. 6 and 7 against the cylindrical component 4b of the input cylinder shaft 4 as a result of the recoil force of the aforementioned coil springs 138 and 139. At this time, the center of the eccentric weight ring 135 (that is, the center of the first eccentric ring 57) is at position $P_L$ in FIG. 6, and the direction of eccentricity at this center $P_L$ in the first eccentric ring 57 (as viewed from the axis A) is a 90° shift around the axis A with respect to the imaginary trunnion line $O_1$, resulting in an amount of eccentricity $\epsilon_1$.

Figure 5:
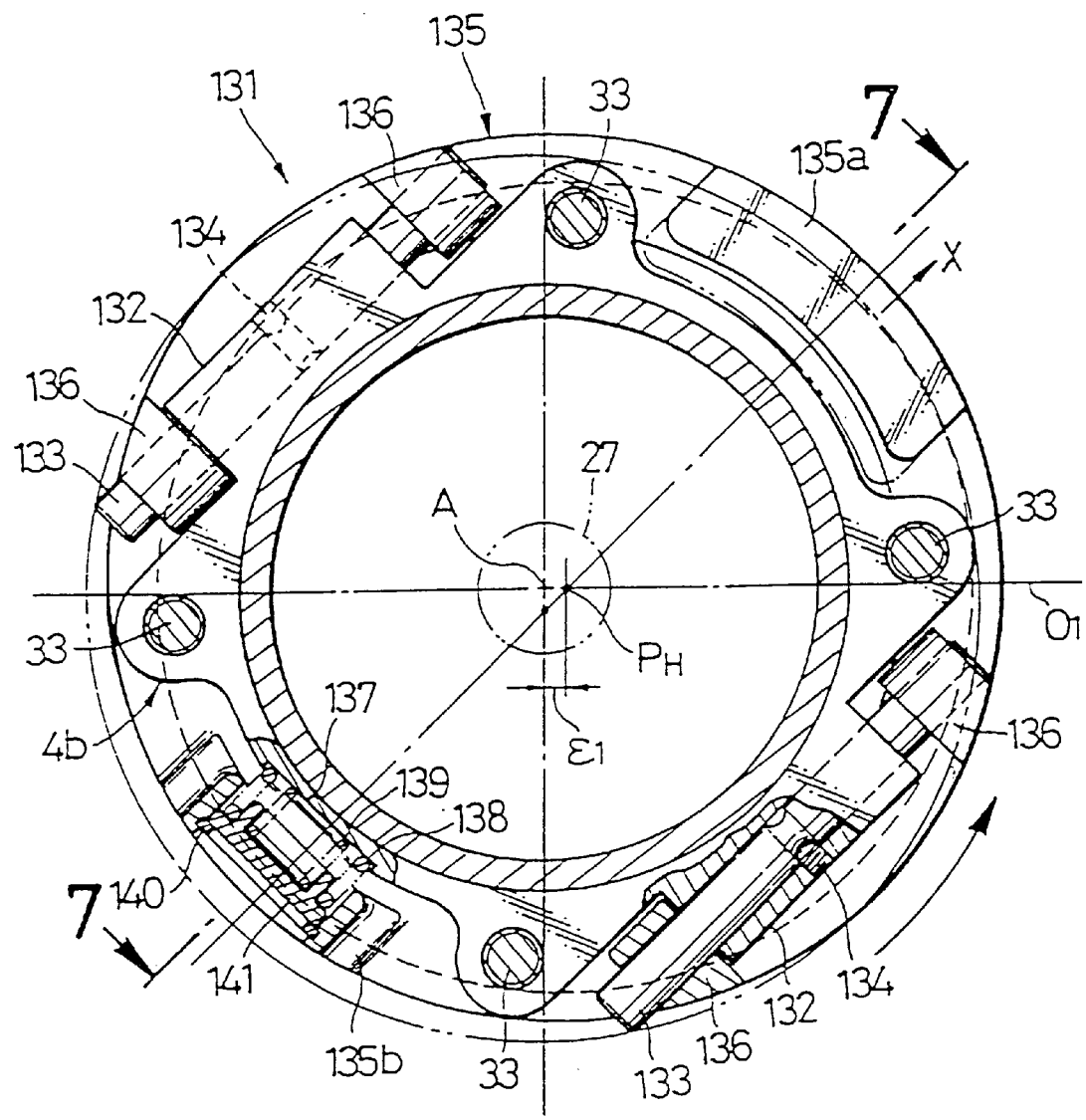
FIG. 5 is a cross-sectional view taken along line 5—5 in FIG. 2.

During the transition from the aforementioned low speed driving state to a high speed driving state, the centrifugal force acting on the aforementioned weight component 135a increases, and when it overcomes the set load of the coil springs 138 and 139, the eccentric weight ring 135 moves in the direction of the arrow X in FIGS. 5 and 7 while compressing the coil springs 138 and 139. When the number of revolutions of the eccentric weight ring 135 is at or beyond a prescribed value, the center of the eccentric weight ring 135 (that is, the center of the first eccentric ring 57) reaches position $P_H$ in FIG. 5, the direction of eccentricity at the center $P_H$ of the first eccentric ring 57 (as viewed from the axis A) is aligned in the direction of the imaginary trunnion line $O_1$, resulting in an amount of eccentricity of $\epsilon_1$.

When the centrifugal force acting on the weight component 135a of the eccentric weight ring 135 is thus low while the continuously variable transmission T is in a low speed driving state, the amount of eccentricity in the direction of the imaginary trunnion line $O_1$ at the center $P_L$ of the first eccentric ring 57 becomes zero, as shown in FIG. 6, resulting in an amount of eccentricity of $\epsilon_1$, in the direction perpendicular thereto. When the centrifugal force acting on the weight component 135a of the eccentric weight ring 135 increases while the continuously variable transmission T is in a high speed driving state, the amount of eccentricity in the direction of the imaginary trunnion line $O_1$ at the center $P_H$ of the first eccentric ring 57 reaches $\epsilon_1$, as shown in FIGS. 4 and 5, resulting in zero eccentricity in the direction perpendicular thereto.

Figure 13:
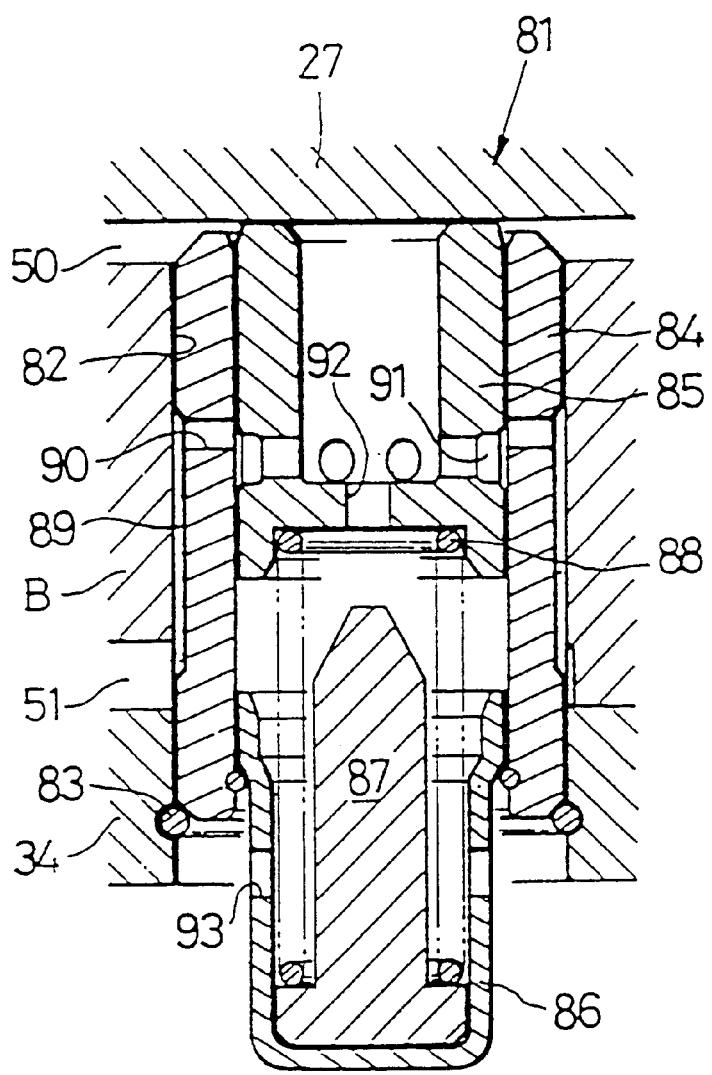
FIG. 13 is a vertical cross-sectional view of a neutral valve.

As shown in FIGS. 2 and 13, the neutral valve 81 includes a valve cylinder 84 fixed by a clip 83 to a cylindrical attachment hole 82 made in the cylinder block B between the inside oil route 50 and outside oil route 51. A spool 85 is provided that slidably fits into the valve cylinder 84. A cup-shaped plug 86 is provided that fits into and is fixed in the aforementioned valve cylinder. A valve element 87 is mounted at the bottom of the cup-shaped plug 86. A return spring 88 is compressed between the valve element 87 and the aforementioned spool 85.

The action of the present practical example of the present invention having the aforementioned composition is described below.

The hydraulic servo motor 110 operates according to the number of engine revolutions and the degree to which the throttle is open. When the angle of inclination of the motor cam plate 19 decreases from the Low (maximum inclination position) to the Top position (upright position), the volume of the hydraulic motor M gradually decreases to zero. As a result, as is evident in Formula 1, the gear ratio of the hydrostatic continuously variable transmission T changes continuously from the low state where the volume of the hydraulic motor M is twice the volume of the hydraulic pump P with a gear ratio r of 3, to the top state where the volume of the hydraulic motor M is zero, with a gear ratio r of 1. When, on the other hand, the volume of the hydraulic motor M increases as a result of increases in the angle of inclination of the motor cam plate 19, the gear ratio of the hydrostatic continuously variable transmission T changes continuously from the top to the low state.

In this case, the direction of eccentricity of the first eccentric ring 57 is changed by the means 131 for changing the direction of eccentricity, so that the gear ratio at the time the vehicle gets underway automatically changes from an infinite gear ratio r to the aforementioned gear ratio r of 3. This action is described below.

At the instant that the engine driving force is transmitted to the input cylinder shaft 4 as the vehicle gets underway, the eccentric weight ring 135, slidably supported radially at the cylindrical component 4b of the input cylinder shaft 4, has a low number of revolutions. The eccentric weight ring 135 is in the position shown in FIG. 6 due to the recoil force of the coil springs 138 and 139, and the center $P_L$ of the first eccentric ring 57 is off center in the direction perpendicular to the imaginary trunnion line $O_1$.

Figure 14:
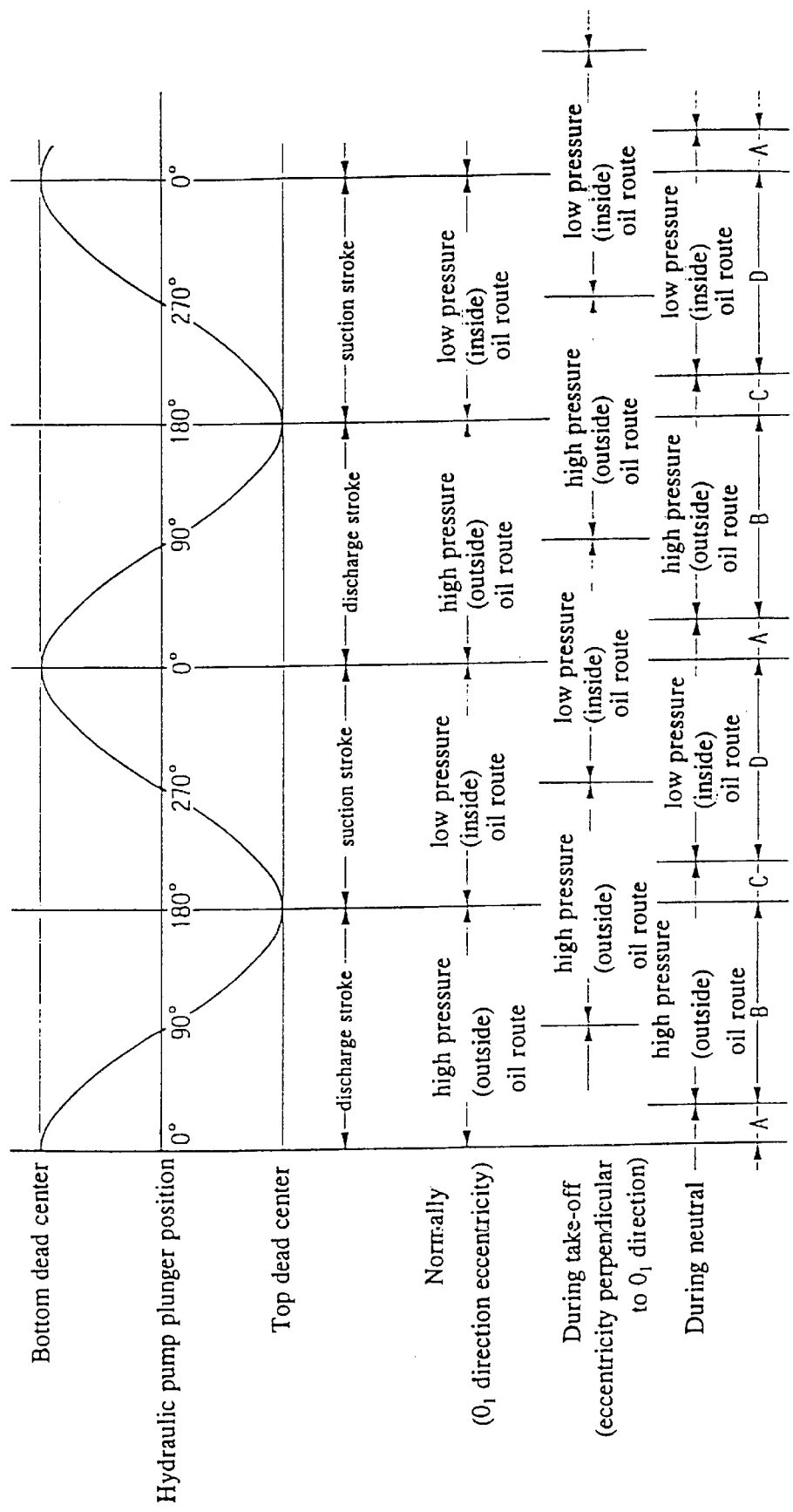
FIG. 14 illustrates the operation of a means for changing the direction of eccentricity.
Figure 15A:
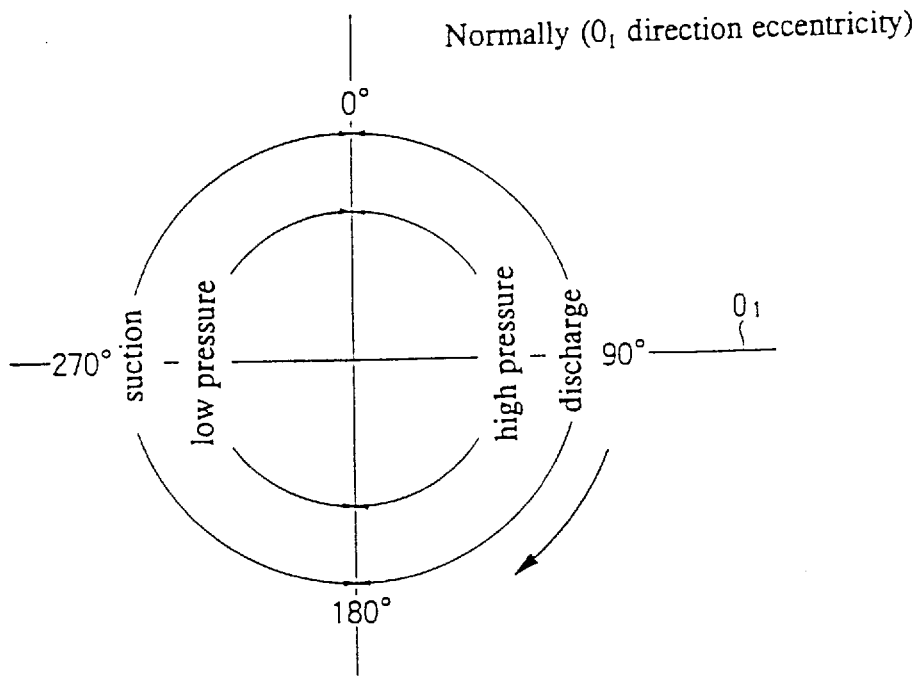
FIGS. 15(A) and 15(B) illustrate the operation of a means for changing the direction of eccentricity.
Figure 15B:
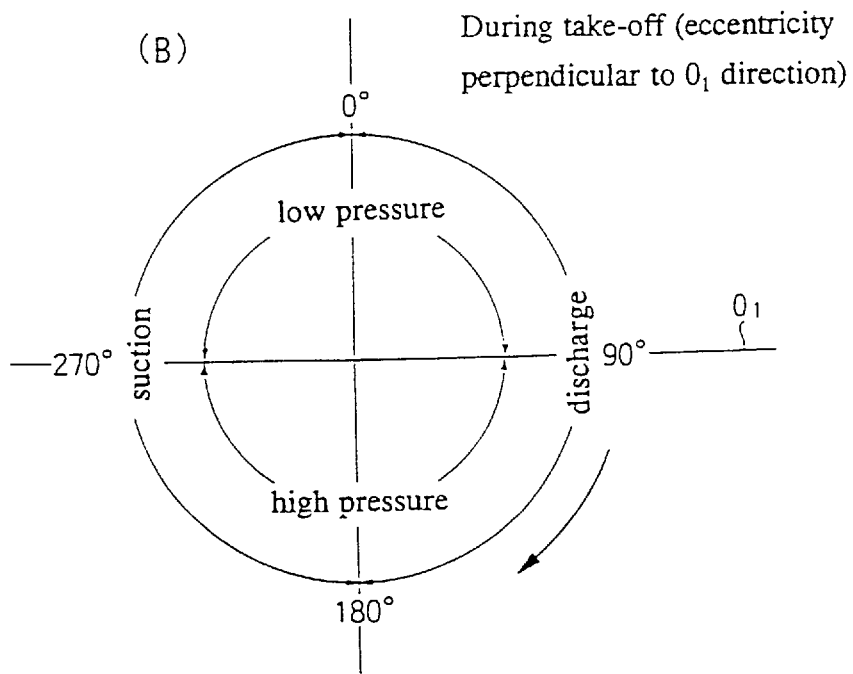

At this time, as shown in FIGS. 14 and 15(B), the first distributing valves 55 guided by the first eccentric ring 57 bring half the cylinder holes 7 during the hydraulic pump P discharge stroke and half the cylinder holes 7 during the suction stroke into communication with the outside oil route (high pressure oil route) 51, as well as half the remaining cylinder holes 7 during the hydraulic pump P discharge stroke and half the remaining cylinder holes 7 during the suction stroke into contact with the inside oil route (low pressure oil route) 50. Accordingly, half the amount of working oil discharged from the cylinder holes 7 during the discharge stroke is suctioned through the outside oil route 51 into the cylinder holes 7 during the suction stroke, and half the remaining amount of working oil discharged from the cylinder holes 7 during the discharge stroke is suctioned through the inside oil route 50 into the cylinder holes 7 during the suction stroke, so the hydraulic pump P volume is essentially zero.

The working oil discharged from the hydraulic pump P circulates through the interior of the hydraulic pump P inside oil route 50, and outside oil route 51 without being supplied to the hydraulic motor M. As a result, the rotation of the input cylinder shaft 4 is not transmitted to the output shaft 27, and the gear ratio of the hydrostatic continuously variable transmission T is infinite.

When the centrifugal force acting on the weight component 135a of the eccentric weight ring 135, slidably supported in the radial direction at the cylindrical component 4b, increases as the number of input cylinder shaft 4 revolutions increases, the eccentric weight ring 135 moves to the position in FIG. 5 against the recoil force of the coil springs 138 and 139, and the center $P_H$ of the first eccentric ring 57 is off center in the direction along the imaginary trunnion axis Or.

At this time, as shown in FIGS. 14 and 15(A), the first distributing valves 55 guided by the first eccentric ring 57 allow all the cylinder holes 7 during the hydraulic pump P discharge stroke to communicate with the outside oil route (high pressure oil route) 51, and allow all the cylinder holes 7 during the suction stroke to communicate with the inside oil route (low pressure oil route) 50. The total amount of working oil discharged from the cylinder holes 7 during the hydraulic pump P discharge stroke is fed through the outside oil route 51 to the cylinder holes 17 during the hydraulic motor M expansion stroke. The total amount of working oil discharged from the cylinder holes 17 during the hydraulic motor M reduction stroke is returned through the inside oil route 50 to the cylinder holes 7 during the hydraulic pump P suction stroke, resulting in the maximum hydraulic pump P volume.

The working oil circulates through the closed hydraulic circuit consisting of the hydraulic pump P outside oil route 51, hydraulic motor M, and inside oil route 50. The working oil discharged from the cylinder holes 7 during the hydraulic pump P discharge stroke is no longer suctioned directly into the cylinder holes 7 during the hydraulic pump P suction stroke. At this time, when the motor cam plate 19 reaches the maximum angle of inclination, the gear ratio of the hydrostatic continuously variable transmission T is in Low. When the angle of inclination of the motor cam plate 19 moves from there to the upright position, the gear ratio can move continuously from Low (gear ratio r of 3) to Top (gear ratio r of 1).

During the continuous transition of the direction of eccentricity of the first eccentric ring 57 from the $P_L$ direction (see FIG. 6) to the $P_H$ direction (see FIG. 5) with the increase in the number of input cylinder shaft 4 revolutions, some of the plurality of cylinder holes 7 during the hydraulic pump P discharge stroke communicate with the outside oil route 51, while the rest communicate with the inside oil route 50. Some of the plurality of cylinder holes 7 during the hydraulic pump P suction stroke communicate with the inside oil route 50, while the rest communicate with the outside oil route 51. As a result, in FIG. 14, the hydraulic pump P discharges an amount of working oil corresponding to B-A and suctions an amount of working oil corresponding to D-C, so the essential volume of hydraulic pump P is a value intermediate between zero and the aforementioned maximum value, resulting in a gear ratio that moves continuously from infinity to the aforementioned Low (gear ratio r of 3). In this way, the combined use of changes in the direction of eccentricity of the first eccentric ring 57 and of changes in the angle of inclination of the motor cam plate 19 allows the gear ratio to be controlled over an extremely wide range ultimately from infinity to 1, and in particular allows a vehicle to get underway smoothly by instantly bringing the gear ratio to infinity to transmit sufficient torque to the drive wheel as the vehicle gets underway.

Furthermore, during the changes in the direction of eccentricity of the first eccentric ring 57, the amount of working oil supplied from the hydraulic pump P to the hydraulic motor M is absolutely determined according to the aforementioned direction of eccentricity. Because there is no change according to the magnitude of the load on the output side, the gear ratio is absolutely determined irrespective of the magnitude of the load on the output side allowing the gear ratio to be controlled with precision.

The hydraulic motor M is inoperative when the vehicle gets underway. Accordingly, when the oil pressure in effect in the inside oil route 50 is low, as shown in FIG. 13, the inner end in the radial direction of the spool 85 in the neutral valve 81 strikes the wall face of the inside oil route 50 due to the recoil force of the return spring 88. The outside oil route 51 communicates with an oil reservoir through the annular groove 89 formed around the valve cylinder 84, the port 90 passing in the radial direction through the valve cylinder 84, the port 91 passing in the radial direction through the spool 85, the valve seat 92 passing in the axial direction through the spool 85, and the through hole 93 passing in the radial direction through the cup-shaped plug 86. Accordingly, when oil pressure is produced in the outside oil route 51 either by design or because the center of the first eccentric ring 57 does not fully return to position $P_L$ in FIG. 6 for some reason, said oil pressure is released through the neutral valve 81 to the oil reservoir, and the hydraulic motor M is not driven by the working oil discharged by the hydraulic pump P. The hydraulic motor M can be driven in this state from the output shaft 27 side, allowing the vehicle to be freely handled by human power.

When there is even a slight increase in the oil pressure acting on the inside oil route 50 as a result of an increase in the number of input cylinder shaft 4 revolutions, the spool 85 moves radially outward against the return spring 88. As a result, the outside oil route 51 is cut-off from communicating with the inside oil route 50 and the oil reservoir, without any communication between the port 91 of the spool 85 and the port 90 of the valve cylinder 84, and the valve seat 92 of the spool 85 seats the valve element 87, cutting off communication between the inside oil route 50 and oil reservoir.

A practical example of the present invention was described above, but the present invention is capable of various design modifications within the essential scope of the invention.

For example, in the practical example, the first eccentric ring 57 was moved by centrifugal force to change the direction of eccentricity, but any driving source can be used to change the direction of eccentricity.

As described above, a simple structure is provided in the present invention, which merely involves changing the phase angle in the direction of eccentricity of the first eccentric ring arranged off center with respect to the axis so as to operate the first distributing valves of the hydraulic pump having a cam plate with a fixed angle of inclination, makes it possible to obtain any gear ratio up to infinity beyond the gear ratio range obtained by varying the volume of the hydraulic motor having a cam plate with a variable angle of inclination. Furthermore, the gear ratio can be reliably controlled because the aforementioned gear ratio is absolutely determined according to the phase angle in the direction of eccentricity of the first eccentric ring and does not change according to the magnitude of the load on the output side. It is thus possible to increase the output side torque so as to allow the vehicle to get underway smoothly by increasing the gear ratio at the time the vehicle gets underway, for example.

The present invention is equipped with a neutral valve that shortens the low pressure oil route and high pressure oil route between the hydraulic pump and hydraulic motor, thereby allowing a completely neutral state to be effected irrespective of shifts in the direction of eccentricity of the first eccentric ring.

The present invention provides a phase angle in the direction of eccentricity of the first eccentric ring is changed by centrifugal force acting on said first eccentric ring, thus dispensing with the need for a separate drive source to move the first eccentric ring and thereby simplifying the structure.

In the present invention, the range where the gear ratio is $1 \leq r < 3$ is under the control of the angle of inclination of the cam plate of the hydraulic motor, and the range where the gear ratio r is $r \geq 3$ is under the control of the phase angle in the direction of eccentricity of the first eccentric ring of Me hydraulic pump, allowing the gear ratio to be controlled over an extremely wide range.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A hydrostatic continuously variable transmission in which a hydraulic pump with a cam plate having a fixed angle of inclination and a hydraulic motor with a cam plate having a variable angle of inclination are connected to each other via a closed hydraulic circuit and includes a low pressure oil route and a high pressure oil route comprising:

an oil pump includes a pump cylinder rotatably supported around a axis, a plurality of pump cylinder holes arranged in a circle around the pump cylinder, a plurality of pump plungers slidably positioned within respective pump cylinder holes, a plurality of first distributing valves enable the cylinder holes to communicate selectively with the aforementioned closed hydraulic circuit, and a first eccentric ring arranged eccentrically with respect to the aforementioned axis so as to drive the first distribution valves; and an eccentric weight ring operatively mounted around an outer peripheral surface of said first eccentric ring, said eccentric weight ring being movable by centrifugal force for adjusting an axis of rotation of said eccentric weight ring and said first eccentric ring;

said hydraulic motor includes a motor cylinder rotatably supported around said axis in an integral manner with the aforementioned pump cylinder, a plurality of motor cylinder holes arranged in a circle around the motor cylinder, a plurality of motor plungers slidably positioned within respective motor cylinder holes, a plurality of second distribution valves that allow the cylinder holes to selectively communicate with the aforementioned closed hydraulic circuit, and a second eccentric ring arranged eccentrically with respect to the aforementioned axis so as to drive the second distribution vales;

wherein said hydrostatic continuously variable transmission includes a phase angle in the direction of eccentricity of the aforementioned first eccentric ring being varied around the aforementioned axis, so as to allow some of the plurality of cylinder holes to communicate with the high pressures oil route during the hydraulic pump discharge stroke and the remainder to communicate with the low pressure oil route, and to allow some of the plurality of cylinder holes to communicate with the low pressure oil route during the suction stroke of the hydraulic pump and the remainder to communicate with the high pressure oil route, thereby allowing the essential volume of the hydraulic pump to be varied so as to control the gear ratio.

2. The hydrostatic continuously variable transmission according to claim 1, and further including a neutral valve that shortens the aforementioned low pressure oil route and high pressure oil route between the hydraulic pump and the hydraulic motor.

3. The hydrostatic continuously variable transmission according to claim 1, wherein the phase angle in the direction of eccentricity of the aforementioned first eccentric ring is varied by the centrifugal force acting on said first eccentric ring.

4. The hydrostatic continuously variable transmission according to claim 1, wherein the range where the gear ratio r is $1 \leq r < 3$ is under the control of the angle of inclination of the cam plate of the hydraulic motor, and the range where the gear ratio r is $r \geq 3$ is under the control of the phase angle in the direction of eccentricity of the first eccentric ring of the hydraulic pump.

5. The hydrostatic continuously variable transmission according to claim 1, and further including a torque limit valve being operatively positioned relative to said oil pump and said hydraulic motor for controlling the supply of oil between inside and outside oil routes of said hydrostatic continuously variable transmission.

6. The continuously variable transmission according to claim 5, wherein the said torque limit valve includes a valve piston and a plug slidably positioned within an opening, a biasing member operatively disposed relative to said valve piston and said plug for biasing said valve piston and said plug relative to each other, a retainer disposed between said valve piston and said plug and a valve element operatively positioned relative to said retainer, wherein excessive oil pressure acting on said valve element opens the valve element for discharging excessive oil pressure from said outside oil route to a discharge port.

7. The continuously variable transmission according to claim 1, wherein the hydraulic motor includes a motor cam plate holder and a motor cam plate anchor in contact with each other and forming a semicylindrical surface centered on a trunnion axis being perpendicular to the axis of the motor cylinder for enabling said motor cam plate holder to tilt around the trunnion axis.

8. The continuously variable transmission according to claim 7, wherein the volume of the hydraulic motor is determined by the stroke of the plurality of the motor plungers for imparting movement of said motor cam plate from an upright position to an inclined position for continuously controlling the gear ratio.

9. The continuously variable transmission according to claim 2, wherein the neutral valve includes a valve cylinder, a spool slidably positioned within said valve cylinder, a valve element disposed within said valve cylinder, a biasing member being positioned between said spool and said valve element for biasing said spool and said valve element relative to each other.

10. The continuously variable transmission according to claim 9, and further including an inside oil route and outside oil route operatively connected to said neutral valve, wherein an increase in oil pressure in the inside oil route imparts radial outward movement to the spool against the biasing member cutting off the communication between the inside oil route and the outside oil route.

11. The hydrostatic continuously variable transmission according to claim 1, wherein said eccentric weight ring further includes a biasing force for initially imparting a movement to the eccentric weight ring during a low speed driving state with low centrifugal force acting on the eccentric weight ring and for shifting the axis of the eccentric weight ring 90° with respect to an imaginary trunnion line.

12. The hydrostatic continuously variable transmission according to claim 1, wherein said eccentric weight ring further includes a biasing force for initially imparting a movement to the eccentric weight ring during a low speed driving state with low centrifugal force acting on the eccentric weight ring and for shifting the axis of the eccentric weight ring 90° with respect to an imaginary trunnion line and wherein the biasing force is overcome during high speed operation for aligning the axis of the eccentric weight ring with the imaginary trunnion line.

* * * * *